United States Patent
Yoo

(10) Patent No.: US 9,236,735 B2
(45) Date of Patent: Jan. 12, 2016

(54) DISTRIBUTED BATTERY MANAGEMENT SYSTEM AND METHOD FOR DISTRIBUTED BATTERY MANAGEMENT

(71) Applicant: HYUNDAI MOBIS CO., LTD., Seoul (KR)

(72) Inventor: Young Uk Yoo, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 410 days.

(21) Appl. No.: 13/845,265

(22) Filed: Mar. 18, 2013

(65) Prior Publication Data

US 2014/0029172 A1 Jan. 30, 2014

(30) Foreign Application Priority Data

Jul. 25, 2012 (KR) .......................... 10-2012-0080916
Dec. 12, 2012 (KR) .......................... 10-2012-0144371

(51) Int. Cl.
G05D 11/00 (2006.01)
H02J 1/00 (2006.01)
H02J 1/10 (2006.01)

(52) U.S. Cl.
CPC .... H02J 1/00 (2013.01); H02J 1/10 (2013.01)

(58) Field of Classification Search
CPC ........................................................ H02J 1/00
USPC ................. 702/63; 307/43; 363/72; 375/257; 361/679.01
See application file for complete search history.

(56) References Cited

U.S. PATENT DOCUMENTS

| 6,327,308 B1* | 12/2001 | Wooten ........................ 375/257 |
| 2007/0076454 A1* | 4/2007 | Burstein et al. ................. 363/72 |
| 2011/0161024 A1* | 6/2011 | Sim et al. ........................ 702/63 |
| 2012/0256488 A1* | 10/2012 | Lim et al. ........................ 307/43 |

FOREIGN PATENT DOCUMENTS

| JP | 2005-229643 A | 8/2005 |
| KR | 10-2011-0013747 B1 | 2/2011 |
| KR | 10-1016813 B1 | 2/2011 |
| KR | 20110071343 A | 6/2011 |
| KR | 10-1104667 B1 | 1/2012 |

OTHER PUBLICATIONS

Korean Office Action issued Dec. 17, 2013 in counterpart Korean Application No. 10-2012-0144371. (5 pages in Korean).

* cited by examiner

Primary Examiner — Mohammad Ali
Assistant Examiner — Sheela S Rao
(74) Attorney, Agent, or Firm — NSIP Law

(57) ABSTRACT

Disclosed is a distributed battery management system of managing a plurality of battery modules, including: slave controllers have a daisy chain structure in which the slave controllers are connected from a bottom-level slave controller up to a top-level slave controller in series, sequentially transfer control information received from the outside from the top-level slave controller up to the bottom-level slave controller, sense information on the battery modules in response to the transferred control information, sequentially transfer the sensed sensing information from the bottom-level slave controller up to the top-level slave controller, and transmit the sensing information transferred to the top-level slave controller to the outside; and a master controller which transmits the control information to the top-level slave controller among the slave controllers and manages the battery modules by using the sensing information received from the top-level slave controller.

14 Claims, 11 Drawing Sheets

DISTRIBUTED BATTERY MANAGEMENT SYSTEM AND METHOD FOR DISTRIBUTED BATTERY MANAGEMENT

CROSS-REFERENCE TO RELATED APPLICATIONS

This application claims priority to and the benefit of Korean Patent Application Nos. 10-2012-0080916 and 10-2012-0144371 filed in the Korean Intellectual Property Office on Jul. 25, 2012 and Dec. 12, 2012, respectively, the entire contents of which are incorporated herein by reference.

TECHNICAL FIELD

The present invention relates to a distributed battery management system, and more particularly, to a distributed battery management system which monitors a battery module by using a master controller and a plurality of slave controllers.

BACKGROUND

A distributed battery management system means a system of monitoring voltages and temperatures of a plurality of battery modules and performing a control function of the battery modules such as cell balancing.

The distributed battery management system may be divided into a master controller, a block controller, and a slave controller. The slave controller monitors information such as a cell voltage and a temperature for each battery module to transfer the monitored information to the block controller, and the block controller transfers data for the battery module which is transferred from the slave controllers corresponding to a block of the block controller to the master controller.

The master controller receives and processes the information of the respective battery modules transferred through the block controller and controls the respective slave controllers through the block controller.

The distributed battery management system senses the battery voltage and temperature for each battery module in the slave controller through the distributed structure of a master and slaves.

That is, in a distributed battery management system in the related art, a separate slave controller is required for each battery module, and a block controller managing the slave controllers for each block is required.

However, in the case of the distributed battery management system in the related art, there are problems in that a microcontroller in which data communication and memory functions are implemented is required for each slave controller, and manufacturing costs increase by using the block controller for transferring only information between the slave controller and the master controller.

Meanwhile, the slave controllers may be connected to each other by wire harnesses. However, when the slave controllers are connected to each other by the wire harnesses, there is a problem in that it is vulnerable to noise generated inside or outside. Particularly, in the case of hybrid vehicles or electric vehicles, the generation of noise may cause a problem. In the case of the hybrid vehicles or the electric vehicles, a motor or an inverter is required, and communication problems may be caused between the slave controllers by the noise generated in the motor or the inverter.

Particularly, when managing a high-voltage battery module, a distributed battery management system and a method for a distributed battery management which have high noise robustness for prevention of accidents are required.

SUMMARY

The present invention has been made in an effort to provide a distributed battery management system having advantages of minimizing a hardware resource of a slave controller installed for each battery module by applying a daisy chain scheme to the system and of decreasing entire manufacturing costs and design costs of the system by removing a block controller.

The present invention has been made in an effort to provide a distributed battery management system and a method for distributed battery management having advantages of increasing robustness for noise and having stability and reliability in communication among the slave controllers.

An exemplary embodiment of the present invention provides a distributed battery management system, including: slave controllers which are provided in plural to correspond to a plurality of battery modules, have a daisy chain structure in which the slave controllers are connected from a bottom-level slave controller up to a top-level slave controller in series, sequentially transfer control information received from the outside from the top-level slave controller up to the bottom-level slave controller, sense information on the battery modules in response to the transferred control information, sequentially transfer the sensed sensing information from the bottom-level slave controller up to the top-level slave controller, and transmit the sensing information transferred to the top-level slave controller to the outside; and a master controller which transmits the control information to the top-level slave controller among the slave controllers and manages the battery modules by using the sensing information received from the top-level slave controller.

The slave controllers may be connected to each other in series so as to have the daisy chain structure and may include sensing ICs for sensing information on the battery modules.

The top-level slave controller may include a microcontroller which receives the control information from the master controller, collects the sensing information, and transmits the collected sensing information to the master controller, and the sensing IC.

The top-level slave controller may collect the sensing information and determine whether or not an error of the collected sensing information exists.

The master controller may receive and store the sensing information transmitted from the top-level slave controller at a predetermined cycle.

The control information may include address and command information of the slave controller.

The sensing information may include one or two or more of voltage, current, and temperature of the battery module.

Another exemplary embodiment of the present invention provides a distributed battery management system, comprising: at least two slave controllers sequentially connected to each other in a daisy chain structure, battery modules connected with the slave controllers, respectively, and a master controller connected with a top-level slave controller among the slave controllers to manage the battery module, in which the top-level slave controller includes a differential signal interface IC which encodes control information transferred from the master controller into an asynchronous differential signal and decodes sensing information which is transferred from each of the slave controllers and corresponds to the encoded control information.

The slave controller may include a sensing IC sensing the battery module.

The top-level slave controller may include a microcontroller which receives the control information from the master controller to transfer the control information to the bottom-level slave controller and receives the sensing information sensed in the sensing IC of the slave controller to transfer the sensing information to the master controller.

The microcontroller may determine whether or not an error of the transferred sensing information exists.

The control information may include address and command information of the slave controller.

Yet another exemplary embodiment of the present invention provides a method for distributed battery management, which is implemented by a distributed battery management system which includes at least two slave controllers sequentially connected to each other in a daisy chain structure, battery modules connected with the slave controllers, respectively, and a master controller connected with a top-level slave controller among the slave controllers to manage the battery module, the method including: encoding control information received from the master controller into an asynchronous differential signal in the top-level slave controller; sequentially transferring the encoded control information up to the bottom-level slave controller; generating sensing information by sensing information on the battery module in response to the transferred control information and transferring the sensing information to the top-level slave controller; and decoding the transferred sensing information in the top-level slave controller.

The control information may include address and command information of the slave controller.

According to the distributed battery management system according to the present invention, since the slave controllers are connected to each other by the daisy chain scheme, the microcontroller which was applied to all the slave controllers in the related art is applied to only a top-level slave controller, and excluded from the rest of the slave controllers, and as a result, the number of components and a load of a hardware design may be reduced, thereby decreasing manufacturing costs.

The top-level slave controller among the slave controllers serves to perform a communication function with the master controller, which is a function of the block controller in the related art, in addition to the sensing function, and as a result, the block controller in the related art may be removed, thereby decreasing the manufacturing costs as compared with the related art.

According to the distributed battery management system and the method for distributed battery management according to the present invention, communication among the slave controllers is configured by an asynchronous communication scheme by a differential, and as a result, although a ground level is changed by noise generated inside or outside, stability and reliability in communication may be increased.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
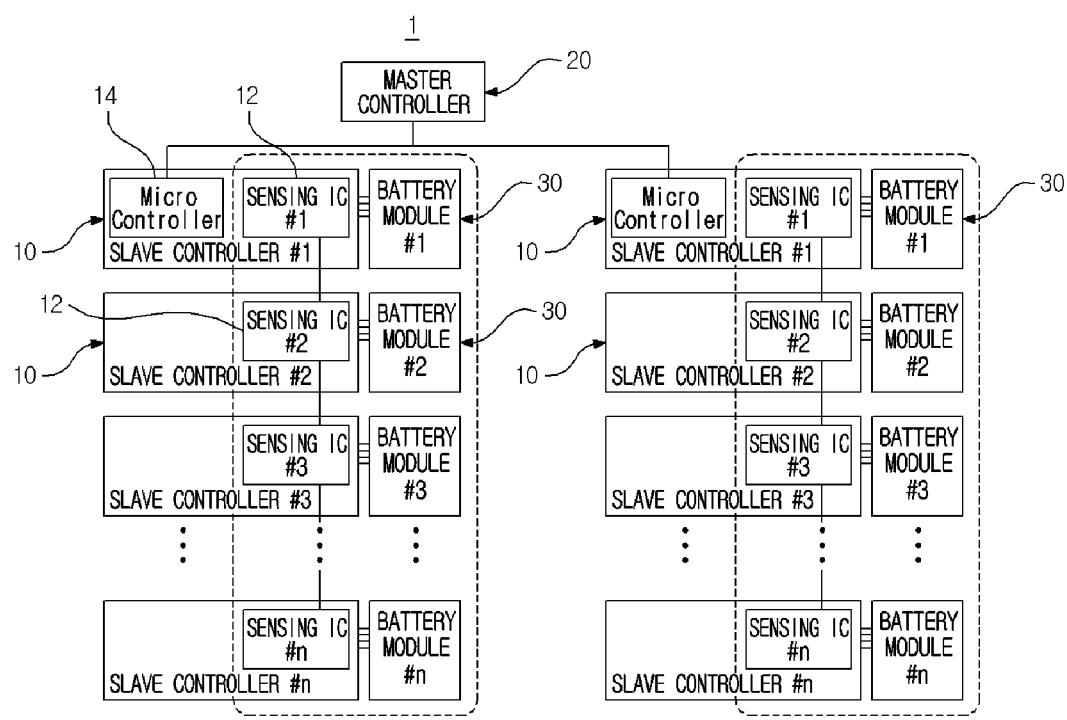
FIG. 1 is a block diagram of a distributed battery management system according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in adding reference numerals to components throughout the drawings, it is to be noted that like reference numerals designate like components even though components are shown in different drawings. The exemplary embodiment of the present invention will be hereinafter described, but it will be understood to those skilled in the art that the spirit and scope of the present invention are not limited thereto and various modifications and changes can be made.

First Exemplary Embodiment

FIG. 1 is a block diagram of a distributed battery management system according to a first exemplary embodiment of the present invention, and slave controllers 10 constituted by two groups are illustrated. Referring to FIG. 1, a distributed battery management system 1 according to the first exemplary embodiment of the present invention includes slave controllers 10 constituted by two groups and a master controller 20, and battery modules 30 are connected to the corresponding slave controllers 10. Here, for convenience, only a left group of the groups of the slave controllers 10 will be described.

The slave controllers 10 are disposed to correspond to the respective battery modules 30 and have a daisy chain structure in which the slave controllers 10 are connected from a bottom-level slave controller 10, #n to a top-level slave controller 10, #1 in series.

Figure 2:
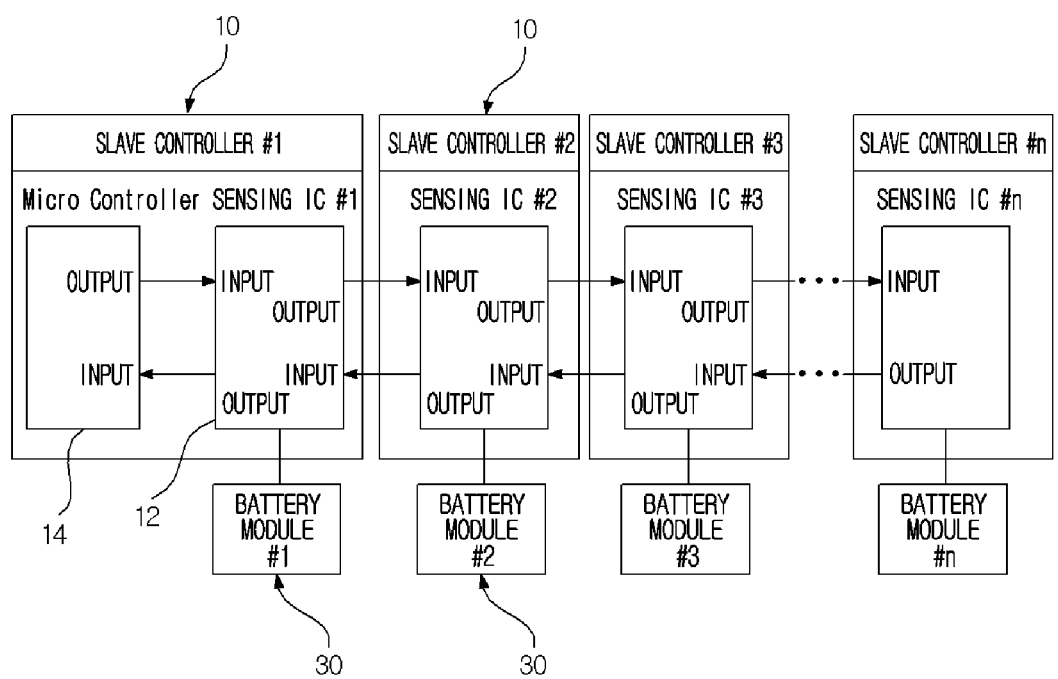
FIG. 2 is a block diagram of slave controllers according to the first exemplary embodiment of the present invention.

FIG. 2 is a block diagram of slave controllers according to the first exemplary embodiment of the present invention. As illustrated in FIG. 2, sensing ICs 12 as an inner configuration are connected to each other in series so that the slave controllers 10 are connected to each other in a daisy chain scheme. The sensing IC 12 is disposed in the slave controller 10, and performs a function of sensing information such as voltage, current, and temperature of the battery module 30 in addition to a function of connecting the slave controllers 10 as described above.

The top-level slave controller 10, #1 among the slave controllers 10 further includes a microcontroller 14 in addition to the sensing IC 12 described above. The sensing IC 12 of the top-level slave controller 10, #1 is connected to the sensing IC 12 of the next lower-level slave controller #2 in series.

The microcontroller 14 serves to receive control information #1 to #n for controlling an operation of the slave controller 10 from the master controller 20, collect sensing information #2 to #n of lower-level slave controllers 10, #2 to #n, and transmit the collected sensing information together with the self-sensed sensing information #1 to the master controller 20.

The control information may include address and command information of the slave controller 10 for controlling the operation of the slave controller 10, and the sensing information is sensed by the sensing IC 12 and may include information such as the voltage, the current, and the temperature of the battery module 30.

The master controller 20 may transmit control information including an address and a command for controlling the battery modules 30 to the top-level slave controller 10, #1 of the slave controllers 10 and receive the sensing information collected by the top-level slave controller 10, #1. As a result, the master controller 20 may monitor and control the battery modules 30.

The master controller 20 may receive the sensing information transmitted from the top-level slave controller 10, #1 at a predetermined cycle. The cycle may be varied according to a state of the battery module 30.

Figure 3:
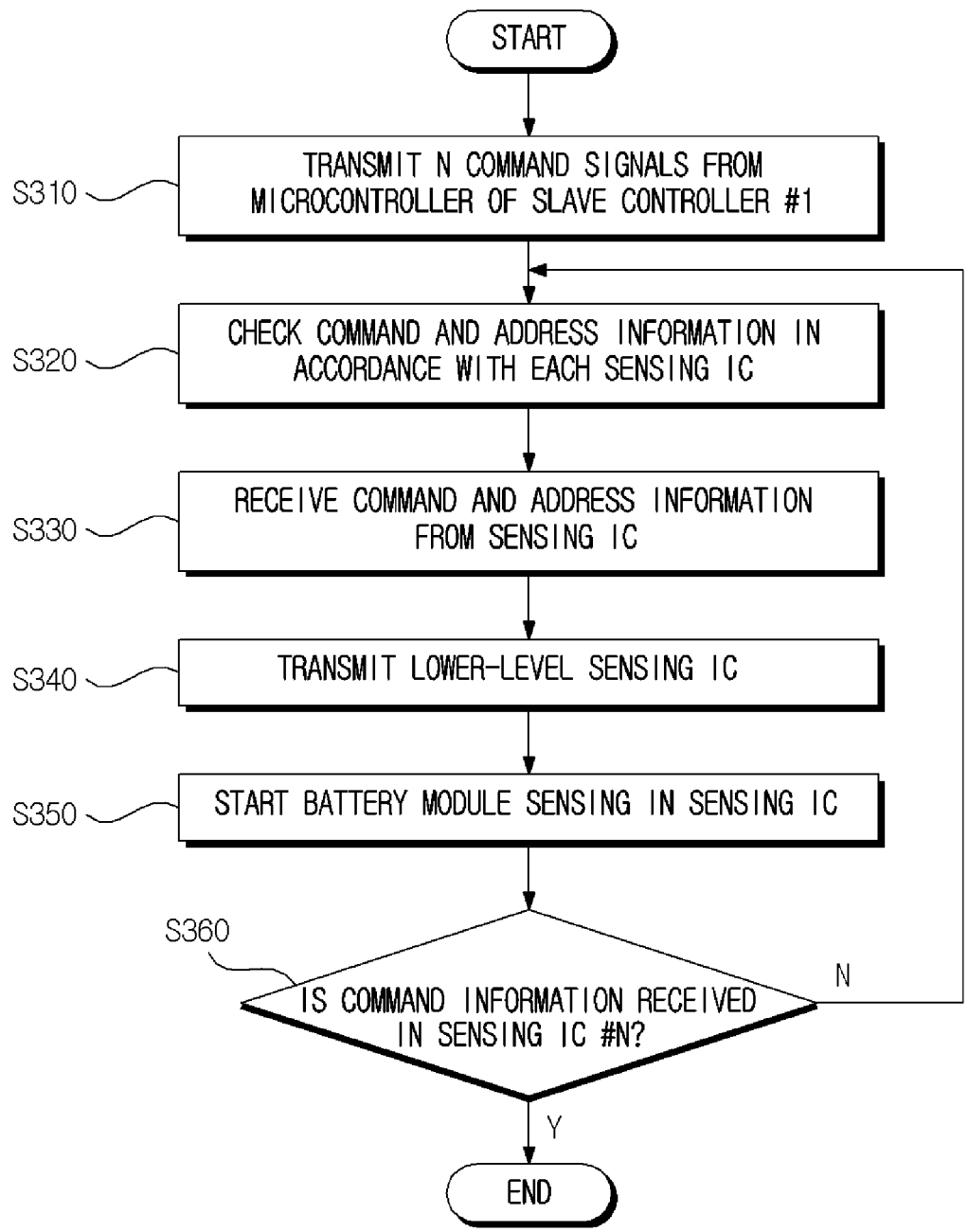
FIG. 3 is a control flowchart for describing a flow of control information among the slave controllers according to the first exemplary embodiment of the present invention.
Figure 4:
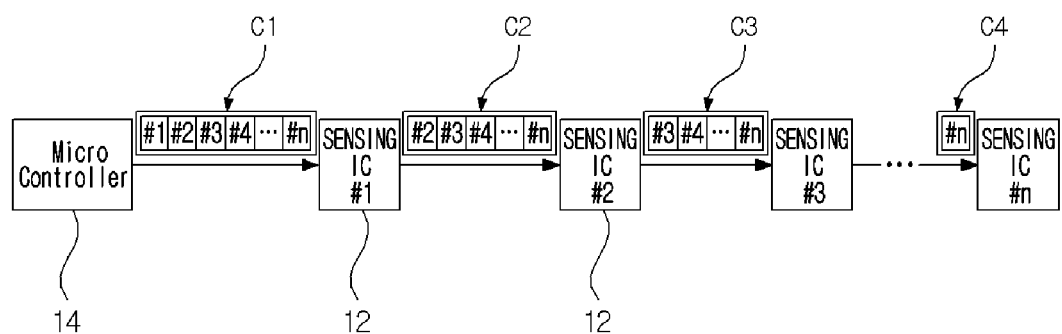
FIG. 4 is a block diagram for describing an operation related with FIG. 3.

Hereinafter, a flow of control information according to the first exemplary embodiment of the present invention will be described with reference to FIGS. 3 and 4. First, the top-level slave controller 10, #1 receives address and command information which is control information transmitted from the master controller 20 (S310). The control information received by the microcontroller 14 of the top-level slave controller 10, #1 is C1 of FIG. 4. C1 includes control information of all the slave controllers 10.

Next, the sensing IC 12 of each slave controller 10 checks the transmitted control information (S320), receives control information corresponding to the sensing IC 12 (S330), transfers the control information to the next lower-level slave controller 10 (S340), and performs sensing for the battery module 30 by the control information corresponding to the sensing IC 12 (S350).

Step S320 to step S350 are repeated until the control information reaches a bottom-level slave controller #n (S360).

That is, the control information is transferred from the upper-level slave controller 10 to the lower-level slave controller 10 through the sensing IC 12 in the order of C1, C2, C3, . . . Cn as illustrated in FIG. 4. The upper-level slave controller 10 includes all the control information of the lower-level slave controllers 10 than the upper-level slave controller.

Figure 5:
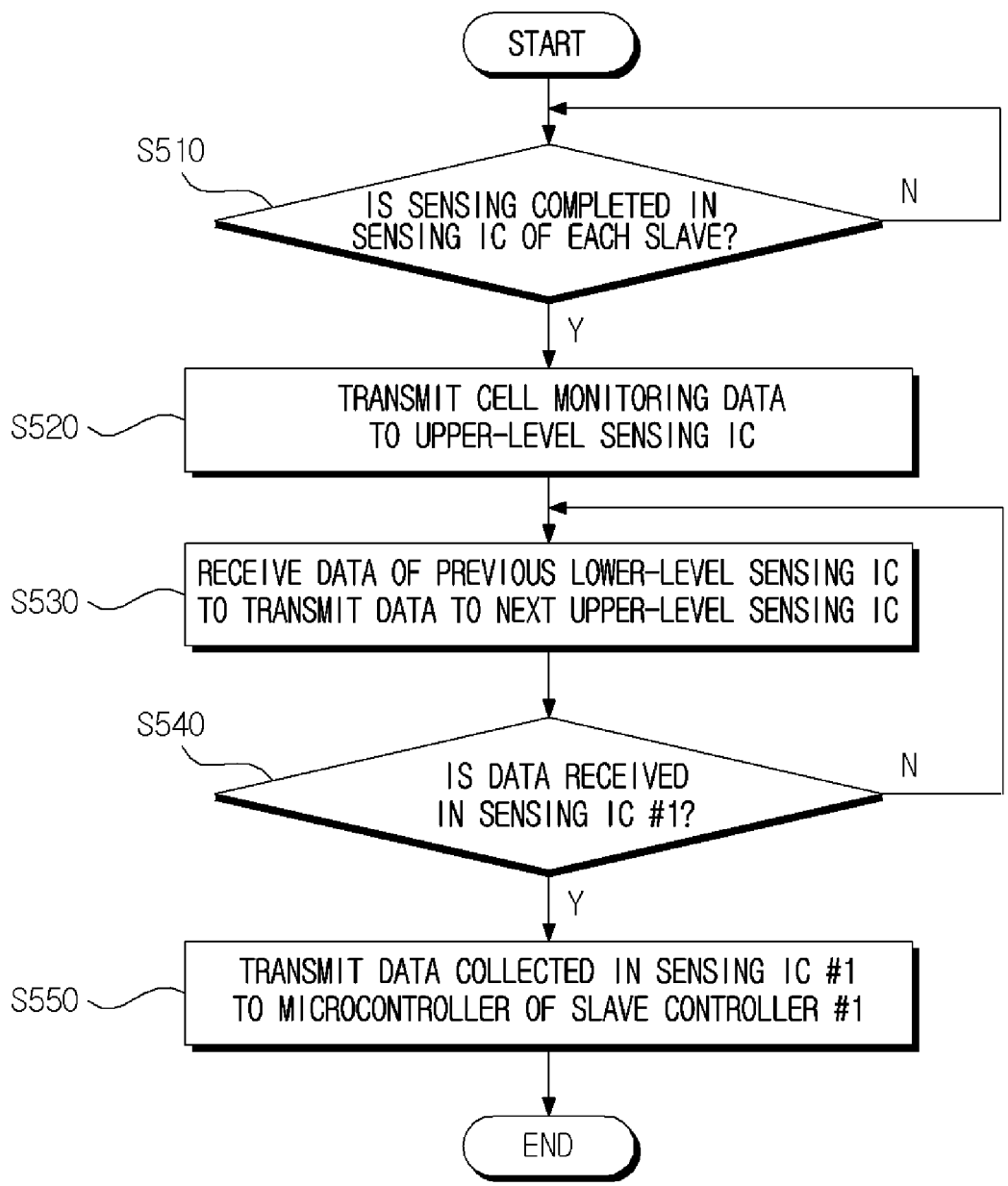
FIG. 5 is a control flowchart for describing a flow of sensing information among the slave controllers according to the first exemplary embodiment of the present invention.
Figure 6:
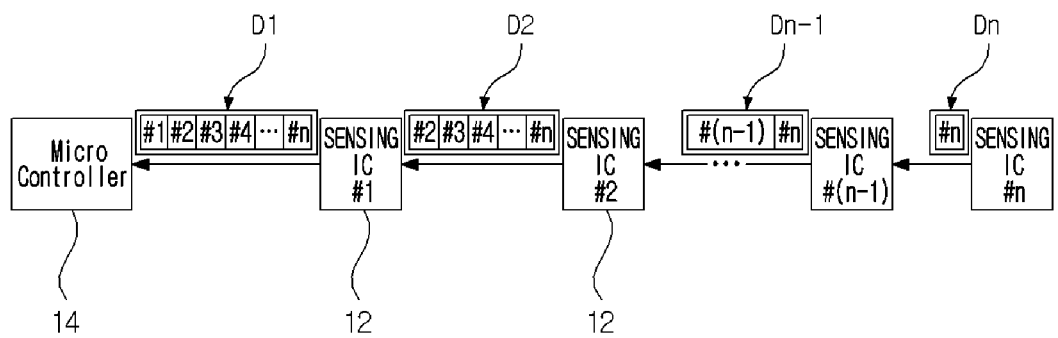
FIG. 6 is a block diagram for describing an operation related with FIG. 5.

Hereinafter, a flow of sensing information according to the first exemplary embodiment of the present invention will be described with reference to FIGS. 5 and 6.

First, when the sensing of the information on the battery module 30 by the sensing IC 12 of the slave controller 10 is completed (S510), the slave controllers 10 sequentially transfer the sensing information from the lower-level slave controller 10 to the upper-level slave controller 10 through the sensing IC 12 (S520 and S530).

The transferring of the sensing information is repeated until the sensing information of the lower-level slave controllers #n to #2 is received in the top-level slave controller #1 (S540).

That is, the sensing information is transferred from the lower-level slave controller 10 to the upper-level slave controller 10 through the sensing IC 12 in the order of Dn, Dn-1, . . . D2 as illustrated in FIG. 6. Accordingly, the sensing information of the lower-level slave controllers #2 to #n is included in D2 which is the sensing information transferred to the top-level slave controller 10, #1.

The microcontroller 14 of the top-level slave controller 10, #1 collects D1 which is the sensing information transferred from the sensing IC 12 of the top-level slave controller 10, #1 (S550). The sensing IC 12 of the top-level slave controller 10, #1 transfers its own sensing information #1 and the sensing information #2 to #n, which is transferred from the slave controllers 10, #2 to #n disposed at the lower-level positions than the top-level slave controller, to the microcontroller 14.

The top-level slave controller 10, #1 may collect the sensing information and determine whether or not an error of the collected sensing information exists. For example, the top-level slave controller 10, #1 may disregardfully remove the sensing information in which it is determined that the error exists and use the sensing information collected at the next cycle.

As such, in the distributed battery management system 1 according to the first exemplary embodiment, since the slave controllers 10 are connected to each other by the daisy chain scheme, the microcontroller which was applied to all the slave controllers 10 in the related art is applied to only the top-level slave controller 10, #1 and excluded from the rest of the slave controllers 10, and as a result, the number of components and a load of a hardware design are reduced to decrease manufacturing costs.

The top-level slave controller 10, #1 among the slave controllers 10 serves to perform a communication function with the master controller 20 which is a function of the block controller in the related art together with the sensing function to remove the block controller in the related art, thereby decreasing the manufacturing costs as compared with the related art.

Second Exemplary Embodiment

Figure 7:
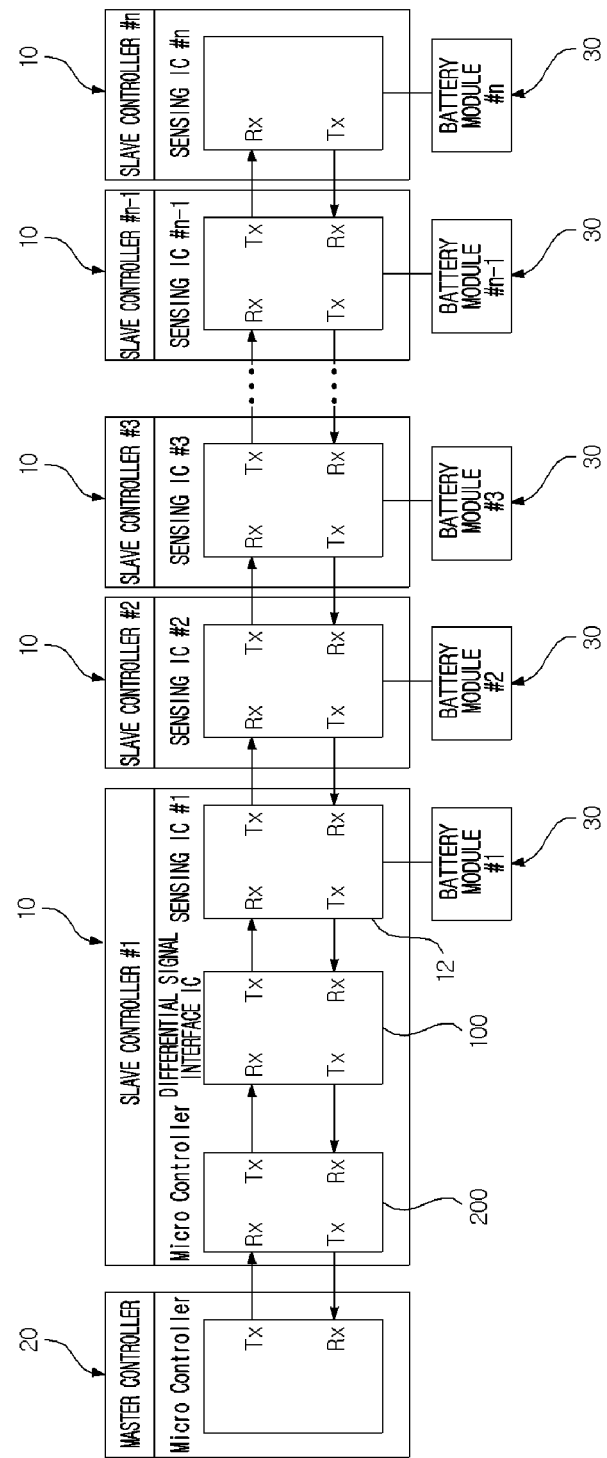
FIG. 7 is a block diagram illustrating a distributed battery management system according to a second exemplary embodiment of the present invention.

FIG. 7 is a block diagram illustrating a distributed battery management system according to a second exemplary embodiment of the present invention.

Referring to FIG. 7, a distributed battery management system according to the present invention may include a differential signal interface IC 100 which encodes control information transferred from a master controller 20 into an asynchronous differential signal and decodes sensing information which is transferred from each slave controller 10 and corresponds to the encoded control information.

A top-level slave controller 10#1 may include a microcontroller 200 in addition to the sensing IC 12. The microcontroller 200 serves to receive control information #1 to #n for controlling an operation of the slave controller 10, collect sensing information #2 to #n of lower-level slave controllers 10#2 to #n, and transmit the collected sensing information together with the self-sensed sensing information #1 to the master controller 20.

First, the control information may include address and command information of the slave controller 10 for controlling an operation of the slave controller 10. The sensing information is sensed by the sensing IC 12 and may include information of voltage, current, and temperature of the battery module 30.

The differential signal interface IC 100 serves to encode the aforementioned control signal into the asynchronous differential signal or decode the aforementioned sensing information into the asynchronous signal. The differential signal interface IC 100 is included in the top-level slave controller 10#1, and in detail, included between the microcontroller 200 and the sensing IC 12.

Figure 8:
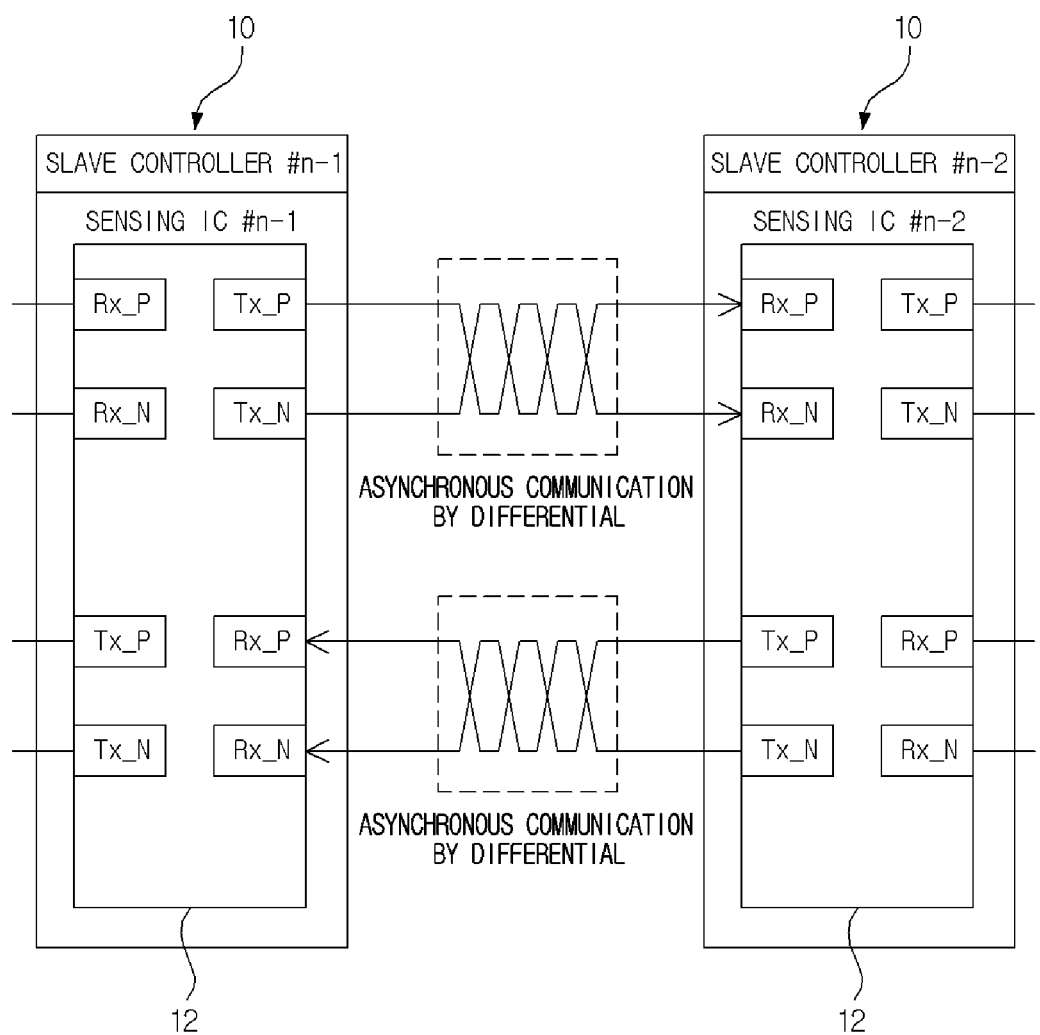
FIG. 8 is a diagram illustrating a state in which control information and sensing information are transmitted and received among the slave controllers through asynchronous communication by a differential.

FIG. 8 is a diagram illustrating a state in which control information and sensing information are transmitted and received among the slave controllers through asynchronous communication by a differential.

Meanwhile, referring to FIG. 8, in the second exemplary embodiment, when data is transmitted or received among the plurality of slave controllers 10, the communication may be performed through four wire harnesses. The four wire harnesses are configured by Tx_Positive, Tx_Negative, Rx_Positive, and Rx_Negative (hereinafter, represented by Tx_P, Tx_N, Rx_P, and Rx_N). All the four ports Tx_P, Tx_N, Rx_P, and Rx_N use a predetermined voltage level (for example, 0 to 5 V, 0 to 3.3 V, or the like) and receive Tx_P to Tx_N values in the sensing IC positioned in each slave controller 10 for each bit. Here, Tx means an output port, and Rx means an input port.

Figure 9:
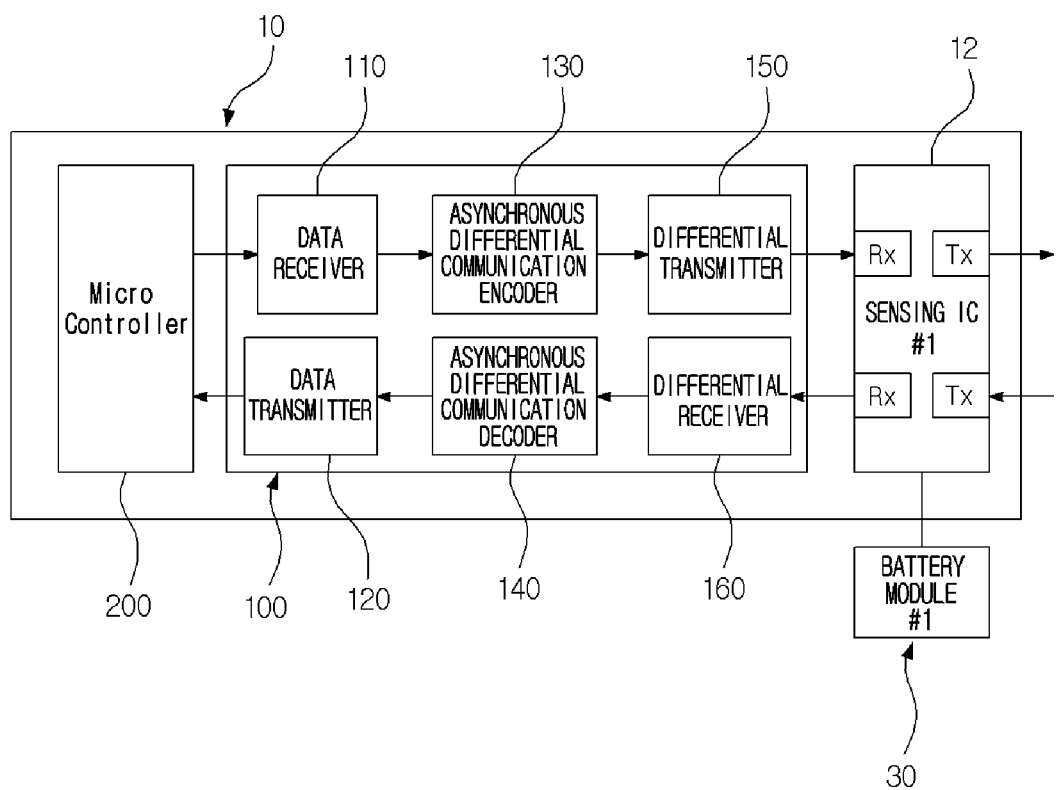
FIG. 9 is a block diagram illustrating a configuration of a differential signal interface IC illustrated in FIG. 8.

FIG. 9 is a block diagram illustrating a configuration of a differential signal interface IC illustrated in FIG. 8.

Referring to FIG. 9, the differential signal interface IC 100 receives control information transferred from the microcontroller 200 through a data receiver 110 provided in the differential signal interface IC 100. The received control information is encoded in an asynchronous differential communication encoder 130 to be transferred to a differential transmitter 150. The differential transmitter 150 transmits the encoded control information to a sensing IC 12#1. The encoded control information is sequentially transmitted to input ports Rx of sensing ICs 12#2 to #n provided in a second-level slave controller 10, through the output port Tx of the sensing IC 12#1.

Figure 10:
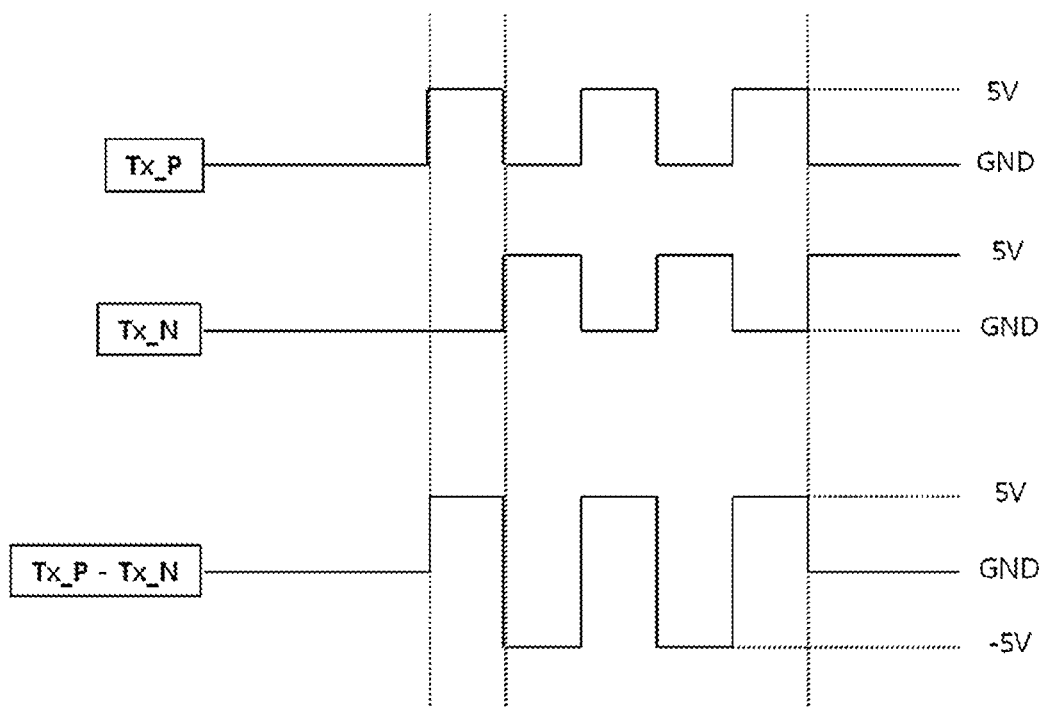
FIG. 10 is a diagram illustrating an asynchronous differential signal.

FIG. 10 is a diagram illustrating an asynchronous differential signal.

Referring to FIG. 10, a high signal of the Tx_P and a high signal of the Tx_N are alternately generated. As a result, a difference Tx_P−Tx_N in a voltage level between the Positive and the Negative is shown as illustrated in FIG. 5. The control information is transmitted for each bit, and generally, the control information may be configured by a start bit at the head, a data bit, and a stop bit. A lower-level sensing IC 12#n−1 receives the control information received from an upper-level sensing IC 12#n−2 in accordance with a decoding rule, and the remaining control information is transmitted to the next lower-level sensing IC 12#n.

The sensing IC 12 included in each slave controller 10 senses sensing information (voltage or temperature) on the corresponding battery module 30 in response to the transmitted control information. The sensing information of the sensing ICs 12#2 to #n is transferred to the sensing IC 12#1 included in the top-level slave controller 10#1, and the sensing information #1 sensed in the sensing IC 12#1 and the transferred the sensing information #2 to #n are transferred to the differential receiver 160.

An asynchronous differential communication decoder 140 sequentially decodes the sensing information transferred from the differential receiver 160. The decoded sensing information is transferred to the data transmitter 120, and the data transmitter 120 transfers the sensing information to the microcontroller 200.

The microcontroller 200 may determine whether or not an error of the received sensing information exists. The microcontroller 200 transmits the sensing information to the master controller 20. The master controller 20 may monitor and control the battery modules 30 by using the received sensing information. The master controller 20 may receive the sensing information transmitted from the top-level slave controller 10#1 at a predetermined cycle. The cycle may be varied according to a state of the battery module 30.

Since the asynchronous serial communication by the differential uses the difference Tx_P−Tx_N in a voltage level between the Positive and the Negative based on the a ground GND as the data bit, even though the level of the ground GND is changed by noise generated outside or inside, stability and reliability in the communication are increased.

When describing the exemplary embodiment of the present invention, four wire harnesses are described, but the present invention is not limited thereto. When validity of communication data is determined or a signal line for a self-diagnosis of the slave controller is required, an additional wire harness in addition to the four wire harnesses may be included by a differential method.

Figure 11:
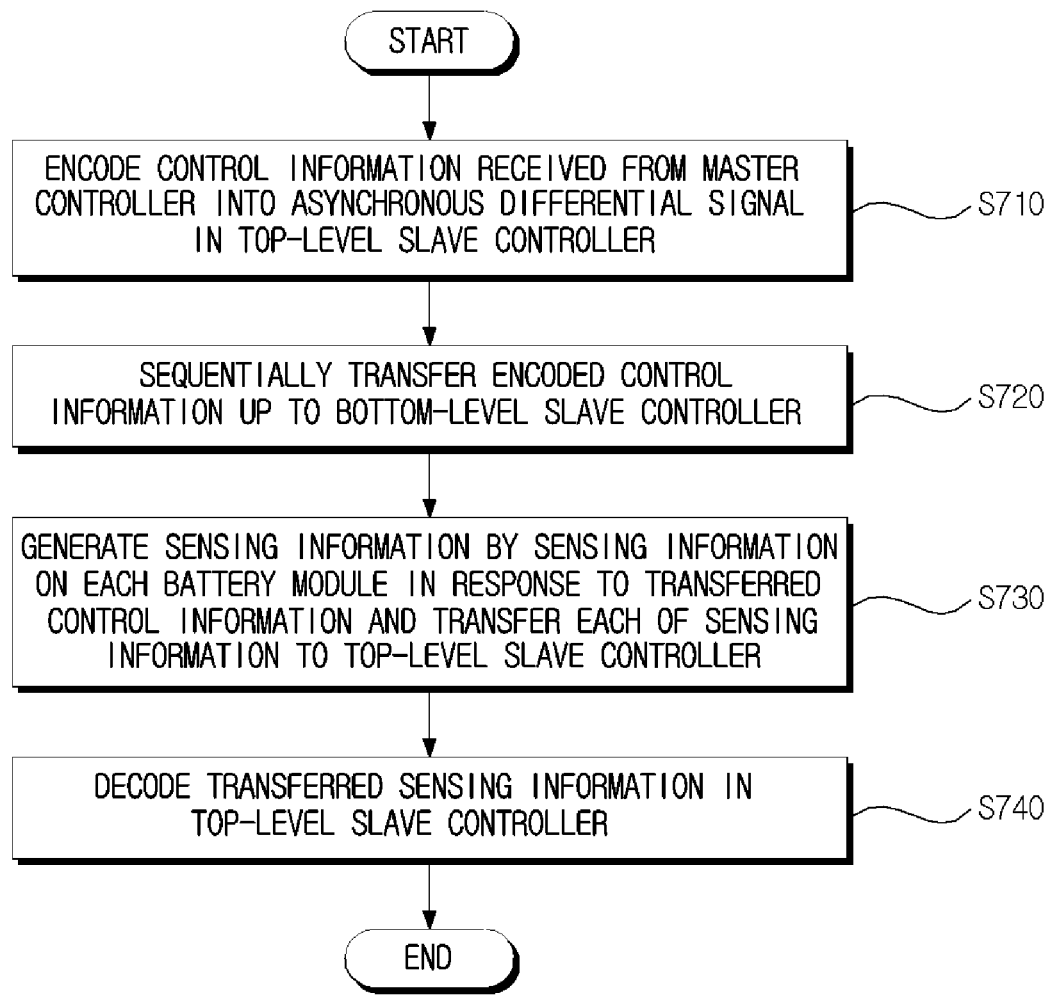
FIG. 11 is a diagram illustrating a method for distributed battery management according to an exemplary embodiment of the present invention.

FIG. 11 is a diagram illustrating a method for distributed battery management according to an exemplary embodiment of the present invention.

Referring to FIG. 11, in the method for distributed battery management according to an exemplary embodiment of the present invention, first, control information received in the master controller 20 through the differential signal interface IC 100 is encoded into an asynchronous differential signal in the top-level slave controller 10#1 (S710). Next, the encoded control information is sequentially transferred up to the bottom-level slave controller 12 (S720). Next, information on each battery module 30 is sensed in response to the transferred control information to generate sensing information, and the sensing information is transferred to the top-level slave controller 10#1 (S730). Next, each of the transferred sensing information is decoded in the top-level slave controller 10#1 through the differential signal interface IC 100 (S740).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A distributed battery management system, comprising:
   slave controllers comprising a bottom-level slave controller and a top-level slave controller, each of the slave controllers corresponding to one of a plurality of battery modules, and the slave controllers being connected in a daisy chain structure in which the slave controllers are connected from the bottom-level slave controller up to the top-level slave controller in series,
   wherein the slave controllers are configured to
      sequentially transfer control information received from a master controller from the top-level slave controller up to the bottom-level slave controller,
      sense sensing information on the corresponding battery modules in response to the transferred control information,
      sequentially transfer the sensed sensing information from the bottom-level slave controller up to the top-level slave controller, and
      transmit the sensing information transferred to the top-level slave controller to the master controller,
   wherein the master controller is configured to transmit the control information to the top-level slave controller, and manage the battery modules by using the sensing information received from the top-level slave controller.

2. The distributed battery management system of claim 1, wherein the slave controllers are connected to each other in series so as to have the daisy chain structure and include sensing integrated circuits (ICs) for sensing information on the battery modules.

3. The distributed battery management system of claim 2, wherein the top-level slave controller includes a microcontroller configured to receive the control information from the master controller, collect the sensing information, and transmit the collected sensing information to the master controller; and the sensing IC.

4. The distributed battery management system of claim 1, wherein the top-level slave controller is configured to collect the sensing information and determine whether or not an error of the collected sensing information exists.

5. The distributed battery management system of claim 1, wherein the master controller is configured to receive and store the sensing information transmitted from the top-level slave controller at a predetermined cycle.

6. The distributed battery management system of claim 1, wherein the control information includes address and command information of the slave controllers.

7. The distributed battery management system of claim 1, wherein the sensing information includes one or more of voltage, current, and temperature of the battery module.

8. A distributed battery management system, comprising:
   at least two slave controllers sequentially connected to each other in a daisy chain structure;
   battery modules connected with corresponding slave controllers among the at least two slave controllers; and
   a master controller connected with a top-level slave controller among the at least two slave controllers to manage the battery modules,
   wherein the top-level slave controller includes a differential signal interface integrated circuit (IC) configured to encode control information transferred from the master controller into an asynchronous differential signal, and decode sensing information which is transferred from each of the at least two slave controllers and corresponds to the encoded control information.

9. The distributed battery management system of claim 8, wherein each of the at least two slave controllers includes a sensing IC configured to sense a corresponding battery module among the battery modules.

10. The distributed battery management system of claim 9, wherein the top-level slave controller includes a microcontroller configured to receive the control information from the master controller to transfer the control information to the bottom-level slave controller, and receive the sensing information sensed in the sensing IC of each of the slave controllers to transfer the sensing information to the master controller.

11. The distributed battery management system of claim 8, wherein the microcontroller is configured to determine whether or not an error of the transferred sensing information exists.

12. The distributed battery management system of claim 8, wherein the control information includes address and command information of the at least two slave controllers.

13. A method for distributed battery management, which is implemented by a distributed battery management system including at least two slave controllers sequentially connected to each other in a daisy chain structure, battery modules connected with corresponding slave controllers among the at least two slave controllers, and a master controller connected with a top-level slave controller among the slave controllers to manage the battery module, the method comprising:
   encoding control information received from the master controller into an asynchronous differential signal in the top-level slave controller;
   sequentially transferring the encoded control information up to a bottom-level slave controller;
   generating sensing information by sensing information on the battery module in response to the transferred control information and transferring the sensing information to the top-level slave controller; and
   decoding the transferred sensing information in the top-level slave controller.

14. The method for distributed battery management of claim 13, wherein the control information includes address and command information of the at least two slave controllers.

* * * * *